United States Patent
Wagner-Stürz

(10) Patent No.: US 12,181,371 B2
(45) Date of Patent: Dec. 31, 2024

(54) ESTABLISHING TERMINATION CRITERIA FOR A PARTIAL-STROKE TEST OF A FLUID DRIVEN SAFETY VALVE, AND DETERMINING THE PROPER FUNCTIONING OF A FLUID DRIVEN SAFETY VALVE

(71) Applicant: SAMSON AKTIENGESELLSCHAFT, Frankfurt am Main (DE)

(72) Inventor: David Wagner-Stürz, Mühltal (DE)

(73) Assignee: SAMSON AKTIENGESELLSCHAFT, Frankfurt am Main (DE)

(*) Notice: Subject to any disclaimer, the term of this patent is extended or adjusted under 35 U.S.C. 154(b) by 303 days.

(21) Appl. No.: 17/773,453

(22) PCT Filed: Oct. 30, 2020

(86) PCT No.: PCT/EP2020/080530
§ 371 (c)(1),
(2) Date: Apr. 29, 2022

(87) PCT Pub. No.: WO2021/084078
PCT Pub. Date: May 6, 2021

(65) Prior Publication Data
US 2022/0390324 A1   Dec. 8, 2022

(30) Foreign Application Priority Data
Oct. 30, 2019 (DE) .......................... 102019129368.5

(51) Int. Cl.
*G01M 13/003* (2019.01)
*F15B 19/00* (2006.01)
(Continued)

(52) U.S. Cl.
CPC ......... *G01M 13/003* (2019.01); *F15B 19/005* (2013.01); *F16K 31/1262* (2013.01);
(Continued)

(58) Field of Classification Search
CPC ............................ F15B 19/005; F15B 20/00; F15B 2211/6313; F15B 2211/6336;
(Continued)

(56) References Cited

U.S. PATENT DOCUMENTS 7,584,643 B2 * 9/2009 Hoffman ............. F16K 37/0091
  73/1.72
9,752,599 B2 * 9/2017 Junk ....................... F15B 19/00
(Continued)

FOREIGN PATENT DOCUMENTS

DE   4218320 A1   12/1993
DE   60020559 T2   3/2006
(Continued)

OTHER PUBLICATIONS

International Search Report for PCT/EP2020/080530 mailed Feb. 8, 2021.

*Primary Examiner* — Andre J Allen
(74) *Attorney, Agent, or Firm* — GrowIP Law Group LLC

(57) ABSTRACT

A method is proposed for establishing termination criteria for a partial stroke test on a safety valve, including: a) A partial stroke test is carried out when the safety valve is operational. b) Position of the valve member and pressure in the drive fluid are recorded. c) A first relation is derived, which relates position of the valve member, time, pressure of the drive fluid, and/or control deviation to one another. d) This relation is defined as a safety valve reference curve. e) A second relation is defined, which has a predetermined distance from the reference curve. f) Termination criterion include: If the partial stroke test is repeated on the same
(Continued)

valve, the same data are recorded and a third relation is derived for the reference curve, the partial stroke test is not passed if the third relation has a greater distance to the reference curve than the second relation.

20 Claims, 6 Drawing Sheets

(51) Int. Cl.
    *F16K 31/126*     (2006.01)
    *F16K 37/00*     (2006.01)

(52) U.S. Cl.
    CPC ... *F16K 37/0083* (2013.01); *F15B 2211/6313* (2013.01); *F15B 2211/6336* (2013.01); *F15B 2211/855* (2013.01); *F15B 2211/8636* (2013.01); *F15B 2211/87* (2013.01); *F15B 2211/8752* (2013.01)

(58) Field of Classification Search
    CPC ........ F15B 2211/855; F15B 2211/8636; F15B 2211/87; F15B 2211/8752; F15B 2211/8755; G01M 13/003; F16K 31/1262; F16K 37/0083
    See application file for complete search history.

(56) References Cited

U.S. PATENT DOCUMENTS

| | | | |
|---|---|---|---|
| 11,486,515 B2 * | 11/2022 | Wagner-Stuerz | ... F16K 37/0083 |
| 2002/0145515 A1 | 10/2002 | Snowbarger et al. | |
| 2003/0062494 A1 * | 4/2003 | Snowbarger | ............. G05B 9/02 |
| | | | 251/89 |
| 2004/0093173 A1 | 5/2004 | Essam | |
| 2009/0222124 A1 | 9/2009 | Latwesen | |
| 2012/0048388 A1 * | 3/2012 | Snowbarger | ........ F16K 37/0091 |
| | | | 137/14 |
| 2012/0139725 A1 | 6/2012 | Grumstrup | |
| 2015/0323936 A1 * | 11/2015 | Junk | ..................... F15B 19/005 |
| | | | 700/282 |
| 2016/0274598 A1 | 9/2016 | Junk | |
| 2018/0112798 A1 * | 4/2018 | Junk | ................... F16K 31/0627 |
| 2022/0412482 A1 * | 12/2022 | Steltner | ................. F15B 19/005 |

FOREIGN PATENT DOCUMENTS

| | | |
|---|---|---|
| DE | 102006003750 A1 | 8/2006 |
| DE | 102011052901 A1 | 2/2013 |
| DE | 102018103324 B3 | 4/2019 |
| WO | 2008122600 A1 | 10/2008 |
| WO | 2009013205 A1 | 1/2009 |

* cited by examiner

ESTABLISHING TERMINATION CRITERIA FOR A PARTIAL-STROKE TEST OF A FLUID DRIVEN SAFETY VALVE, AND DETERMINING THE PROPER FUNCTIONING OF A FLUID DRIVEN SAFETY VALVE

CROSS-REFERENCE TO RELATED APPLICATIONS

This application is a U.S. National Stage Application that claims the benefit of the filing date of International PCT Application No. PCT/EP2020/080530, filed Oct. 30, 2020, that claims priority to German Patent Application No. DE102019129368, filed on Oct. 30, 2019, which are hereby incorporated by reference in their entirety.

FIELD OF THE INVENTION

The invention relates to a method for establishing termination criteria for a partial stroke test on a fluidically driven safety valve. These termination criteria determine whether such a test is evaluated as passed or failed and therefore have a decisive influence on the maintenance situation of fluid-driven safety valves.

Furthermore, the invention relates to a method for determining the operability of a fluidically driven safety valve.

If a valve member remains in one position for a long time, the static friction and thus the breakaway force required to move the valve member may be greatly increased due to deposits, corrosion and/or adhesion. The drive energy may then no longer be sufficient to surely move the valve member.

In the case of safety valves, however, it must be ensured that the drive energy is sufficient under all circumstances to move the valve member to a safety position. To ensure that the valve member can be moved against the increased frictional forces even after a long rest period, a partial stroke test is therefore carried out regularly. Such a test can be used to check the basic movability of the valve member.

The typical course of a partial stroke test can be understood from FIG. 1. There, the relative stroke of the valve member and the pressure over time during a partial stroke test on a safety valve are shown. The safety valve has a single-acting, pneumatic actuator with spring return. The safety position is currentless closed. The setpoint 210 shows the ideal frictionless stroke characteristic when the valve is closed during uniform venting. The pressure is reduced and the spring forces of the actuator are released and move the valve member towards the closed position. The actual pressure curve 220 initially shows a clear reduction in pressure before the stroke (actual stroke) 230 changes. This shows the valve member breaking free from its open position, in which it may already have been stuck, i.e. subject to static friction. The difference between the initial maximum pressure and the pressure at the moment of breakaway is referred to as breakaway pressure 240. The breakaway pressure is the pressure or force sufficient to overcome static friction and release the valve. The pressure in the actuator fluid at the moment of breakaway remains as reserve 250, provided it is greater than 0 bar. If not, the safety valve can no longer fulfill its function. The pressure is readjusted after breakaway, i.e. increased again, so that overshooting is avoided or reduced. After the static friction has been overcome and the stroke movement accelerated, the actuator is vented uniformly (slow pressure reduction) until 90% of the stroke is reached. In the range of sliding friction, the actual stroke curve 230 runs approximately linear and parallel to the target stroke curve 210, shifted parallel by the amount of sliding friction. After reaching 90%, the pressure in the actuator is increased again so that the valve member again opens fully against the spring forces. The partial stroke test is completed.

Eliminating the time and plotting the pressure 220 versus the stroke 230 produces the stroke-pressure curve of FIG. 2. The closing pressure reserve 320 is the pressure reserve that remains after the safety valve is closed. The closing pressure reserve 320, which occurs with constant motion (sliding friction), can be determined from FIG. 2. For this purpose, the stroke-pressure curve according to FIG. 2 is extrapolated further to the closed position (stroke=0).

BACKGROUND

An actuator for an open-close valve with pneumatic actuator, in which a positioner is provided that contains a routine for performing a partial stroke test, is described in WO 2009/013205 A1.

The publication DE 10 2011 052 901 A1 also describes how the drive energy for performing a partial stroke test can be controlled in such a way that excessive overshooting is prevented after the static friction has been overcome.

During a partial stroke test, a stroke-pressure curve is recorded. The stroke-pressure curve can be used, for example, to determine a pressure reserve of an actuator. Such a procedure is described in publication DE 10 2018 103 324 B3. The pressure reserve can provide information on whether the valve closes reliably in a safety case.

To determine the criteria at which a partial stroke test is considered failed, it is common practice to proceed as follows:

A reference curve is recorded for a fully functional control valve. Based on experience, it is known which deviations of a stroke-time curve or stroke-pressure curve just ensure safe operation. These values are permanently stored as termination limit values and apply to the entire course of the stroke-pressure curve and to all such valves.

If the position control or regulation of the control valve is a proportional control (also referred to as P-control), the control deviation (difference to the set position) and the pressure serve as abort criteria. When the pressure chamber is slowly vented during the partial stroke test, it is determined whether the actuating force of the springs is sufficient to break free or move the valve member as intended. For this purpose, a pressure sensor or the pressure by means of the IP transducer signal is required. If, for example, the control deviation is greater than 3-5% or the pressure in the actuator of the valve is less than 2.5 bar, the test is considered faulty. This means that it must be possible to reach the end test position at a pressure greater than 2.5 bar in order to complete the test positively. The end position must not deviate by more than 3-5% from the end position in the reference curve. These fixed termination criteria are the same for all test sections and for all times.

These fixed termination limit criteria mean that, in the event of a termination, it is not clear how great the change is compared to the functionally safe state measured previously (during the last partial stroke test passed). Changes in the physical behavior caused by disturbance variables such as downtime, medium pressure and/or medium temperature, but which do not fundamentally prevent the safety valve from functioning, are also not taken into account.

SUMMARY

Object of the Invention

The object of the invention is to provide a method that provides better termination criteria for a partial stroke test, and to provide a method that can be used to more reliably determine the operability of a fluid-powered safety valve.

Solution

This problem is solved by the object of the independent claim. Advantageous embodiments of the subject-matter of the independent claim are specified in the sub-claims. The wording of all claims is hereby incorporated in this description by reference.

The use of the singular is not intended to exclude the plural, which must also apply in the reverse sense, unless otherwise disclosed.

In the following, individual process steps are described in more detail. The steps need not necessarily be carried out in the sequence indicated, and the process to be described may also include further, unmentioned, steps.

To solve the problem, a method is proposed for establishing termination criteria for a partial stroke test on a fluidically driven safety valve with a valve member and a spring return. The valve member is to be moved to a safety position by the spring return in the event of a complete drop in the pressure of the drive fluid, wherein the pressure of the drive fluid acts against the spring. The safety valve has means for determining the pressure of the drive fluid and means for determining the position of the valve member. The method comprises the following steps:

(a) A first partial stroke test is performed on the safety valve by varying the pressure in the drive fluid, this partial stroke test being performed at a time when the safety valve is operational, e.g. when the safety valve is put into operation.

b) At least the position of the valve member and the pressure in the drive fluid are recorded during the first partial stroke test.

c) A first relation is derived from the recordings, which relates the position of the valve member and/or the time and/or the pressure of the drive fluid and/or another parameter recorded during the first partial stroke test. This can be, for example, a stroke-pressure curve.

d) This relation is defined and stored as a reference curve for this safety valve in the operational state.

e) At least one second relation is defined which has a predetermined distance to the reference curve. This at least one second relation can, for example, be a tolerance band around the stroke-pressure curve.

f) The termination criterion for a repeated partial stroke test to be carried out later, e.g. during future regular checks of the same safety valve, is defined: If the repeated partial stroke test is performed on the same valve, the same data are recorded, and a third relation is derived from the data in the same way as for the reference curve, the repeated partial stroke test is considered failed if the third relation has a greater distance to the reference curve at at least one point than the second relation.

In this way, termination criteria for future partial stroke tests on the respective specific safety valve can be defined, which flexibly take into account the characteristics of the valve. Thus, whether the valve passes the partial stroke test or not depends more on changes in the maintenance condition of the valve and less on how much this particular valve differs from some ideal valve.

Preferably,
the stroke of the valve member as a function of time or
the pressure in the actuator or drive of the valve as a function of time or
the stroke of the valve member as a function of the actuator pressure
is used as first relation. The first relation to be used typically depends on the control or regulation of the valve position when the partial stroke test is performed.

If the valve has a position control that is used during the partial stroke test and if this position control is a proportional control with a control deviation, an embodiment of the method is preferred in which the sum of the setpoint or target curve for the position control of the valve member and the control deviation is used as the first relation.

If, on the other hand, the valve has a position control used during the partial stroke test which is not a pure proportional control, an embodiment of the method is preferred in which the output variable of the position control as a function of time is used as the first relation.

A particularly simple design of the termination criteria for the partial stroke test is obtained if the second relation has a fixed distance of, for example, 2% from the reference curve. For the sake of simplicity, this distance can apply both upwards and downwards.

The abort criteria are more likely to correspond to the specific situation of the valve under consideration if the second relation has different distances to the reference curve for different positions of the valve member.

In that case it is particularly useful if the different distances of the second relation to the reference curve apply to different ranges of the movement of the valve member during a partial stroke test. Typically, the course is therefore divided into four ranges:

the breakaway range, which is dominated by overcoming static friction;
the range dominated by sliding friction, in which the valve member moves without any other special features;
the range of motion reversal, when the valve member has reached 10% of its closing travel, which is dominated by hysteresis;
and the range of return of the valve member to the fully open position, again dominated by sliding friction.

This subdivision is useful because in certain ranges higher deviations from the ideal course of a partial stroke test may occur without calling into question the operability of the safety valve, while in other ranges such high deviations must necessarily lead to abort and failure. For example, it is readily possible that a relatively high pressure reduction is required during breakaway, so that the valve member lags strongly behind the reference curve. This is not critical if the valve member again approaches the reference curve more closely during further travel. Therefore, in a typical application, a higher deviation is permissible in the breakaway range.

For certain valve types or system configurations, it can also be advantageous to define the different distances and ranges in such a way that stick-slip effects are taken into account. These typically occur immediately after the start of movement and manifest themselves in a progression of the stroke over time that is similar to a staircase function. When the valve member sticks, its position does not change. After that, there is an abrupt correction of the position (slip). The height of these steps can be used as a criterion for designing the at least one second relation. In the range in which these steps occur, the distance of the at least one second relation from the reference curve will be made larger. In particular, it is conceivable that the tolerance range above the reference curve must be selected larger than the tolerance range below the reference curve under these conditions.

Preferably, the second relation has different upward and downward distances to the reference curve. This is particularly advantageous if the reference curve is a stroke-pressure curve. In this case, larger upward than downward deviations from the reference curve are typically to be expected, since a greater reduction in actuator pressure is required in the case of normal wear than in the case of a valve in the ideal state.

In a particularly preferred further development of the method, the distances of the second relation to the reference curve are determined dynamically as a function of current conditions at the valve and/or at the plant at the time at which the partial stroke test is carried out. This allows influences such as downtime, temperatures, process pressure to be taken into account which are not or hardly related to the basic operability of the valve. For example, it is possible to allow higher deviations after a long standstill time of the valve, and accordingly to apply stricter criteria in cases where the valve was moved shortly before the partial stroke test.

It is also advantageous if the partial stroke test is additionally considered failed if the pressure in the drive fluid falls below a predetermined value. In principle, it is possible to specify limits for the breakaway pressure and/or the pressure at the reversal point of the partial stroke test movement and/or the pressure during the entire course of the test.

To solve the problem, a method is further proposed for determining the operability of a fluidically driven safety valve having a valve member and a spring return. The valve member is to be moved to a safety position by the spring return in the event of a complete drop in the pressure of the drive fluid; the pressure of the drive fluid acting against the spring. The safety valve has means for determining the pressure of the drive fluid and means for determining the position of the valve member. The method comprises the following steps:

A partial stroke test is performed on the safety valve.
A method as described above was performed at an earlier time on the same safety valve.
Based on the termination criteria for this valve defined by this method described above, it is decided whether or not the valve has passed the partial stroke test and whether or not it is still to be considered operable.

This method makes it possible to determine with greater accuracy than usual whether a safety valve is still operable or not. In particular, the result better fits the situation of the specific valve under consideration, and it may even be possible to draw conclusions about the type of impairment of the valve from which criterion was violated in the case of failure. Both the maintenance cycles of the valve and the scope of work of the maintenance measures can be optimized in this way.

The problem is further solved in that in a method as described above, the method steps are formulated as program code with which the method is performable on at least one computer.

Furthermore, the problem is solved by a computer program comprising executable instructions which, when executed on a processing unit, a microcontroller, DSP, FPGA or computer or on a plurality thereof in a network, performs the method according to any of the preceding method claims.

Furthermore, the problem is solved by a computer program having program code means for performing the method according to the disclosure in any one of its embodiments if the program is executed on a processing unit, a microcontroller, DSP, FPGA or computer or on a plurality thereof in a network. In particular, the program code means may be instructions stored on a computer-readable data storage medium.

Furthermore, the problem is solved by a data storage medium on which a data structure is stored which, after being loaded into a working and/or main memory of a processing unit, a microcontroller, DSP, FPGA or computer or a plurality thereof in a network, performs the method according to the disclosure in any one of its embodiments.

Also the problem is solved by a computer program product having program code means stored on a machine-readable storage medium for performing the method according to the disclosure in any one of its embodiments, if the program is executed on a processing unit, a microcontroller, DSP, FPGA or computer or on a plurality thereof in a network. In this context, a computer program product is understood to be the program as a tradable product. In principle, it may be in any form, for example on paper or a computer-readable data storage medium, and may in particular be distributed via a data transmission network.

Finally, the problem is solved by a modulated data signal containing instructions executable by a processing unit, a microcontroller, DSP, FPGA or computer or by a plurality thereof in a network, for performing the method according to the disclosure in any one of its embodiments.

As computer system for performing the method, a single computer or microcontrollers, DSPs or FPGAs may be considered, as well as a network of microcontrollers, DSPs, FPGAs or computers, for example an in-house closed network, or computers connected to each other via the Internet. Furthermore, the computer system may be realized by a client-server constellation, wherein parts of the disclosure run on the server, others on a client.

Further details and features result from the following description of preferred embodiments in connection with the figures. The respective features may be implemented individually or in combination with each other. The possibilities of solving the task are not limited to the embodiments. For example, range specifications always comprise all—unmentioned—intermediate values and all conceivable sub-intervals.

Some embodiments are shown schematically in the figures. Identical reference numbers in the individual figures designate identical or functionally identical elements or elements corresponding to each other with respect to their functions. In detail:

DETAILED DESCRIPTION

Figure 1:
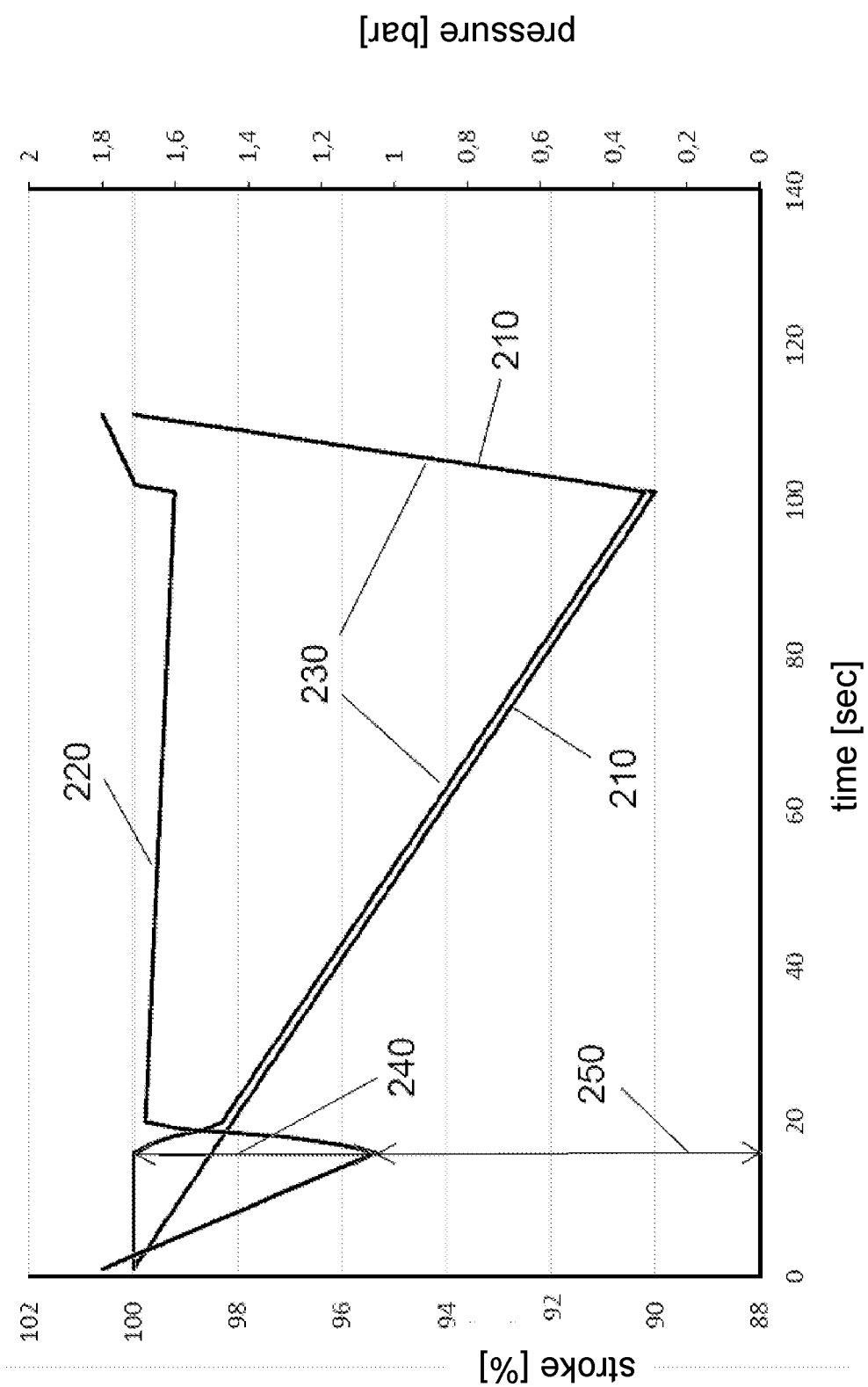
FIG. 1 shows a stroke-time curve and the associated pressure-time curve during a partial stroke test on a typical safety valve.
Figure 2:
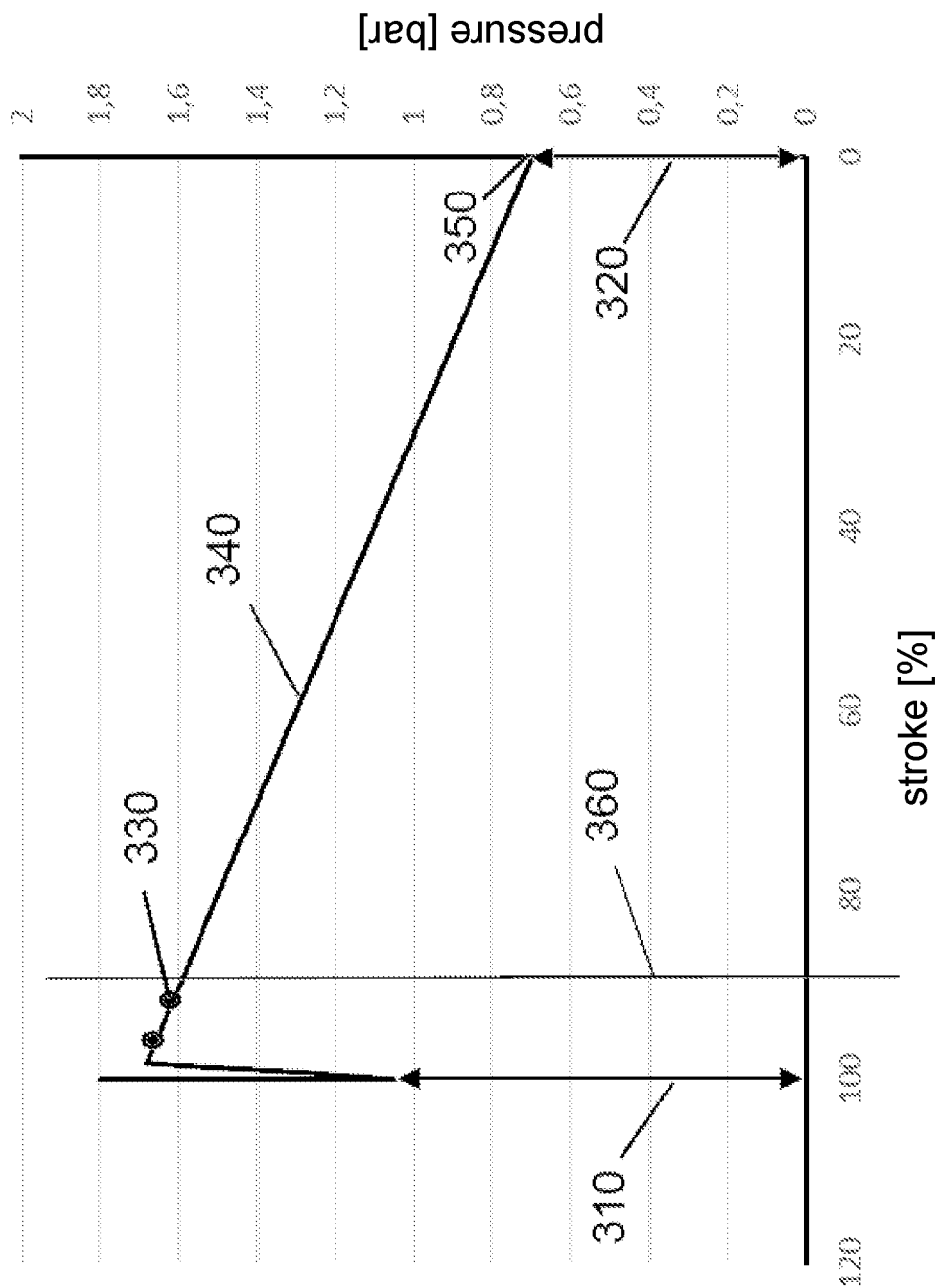
FIG. 2 shows a corresponding stroke-pressure curve.
Figure 3:
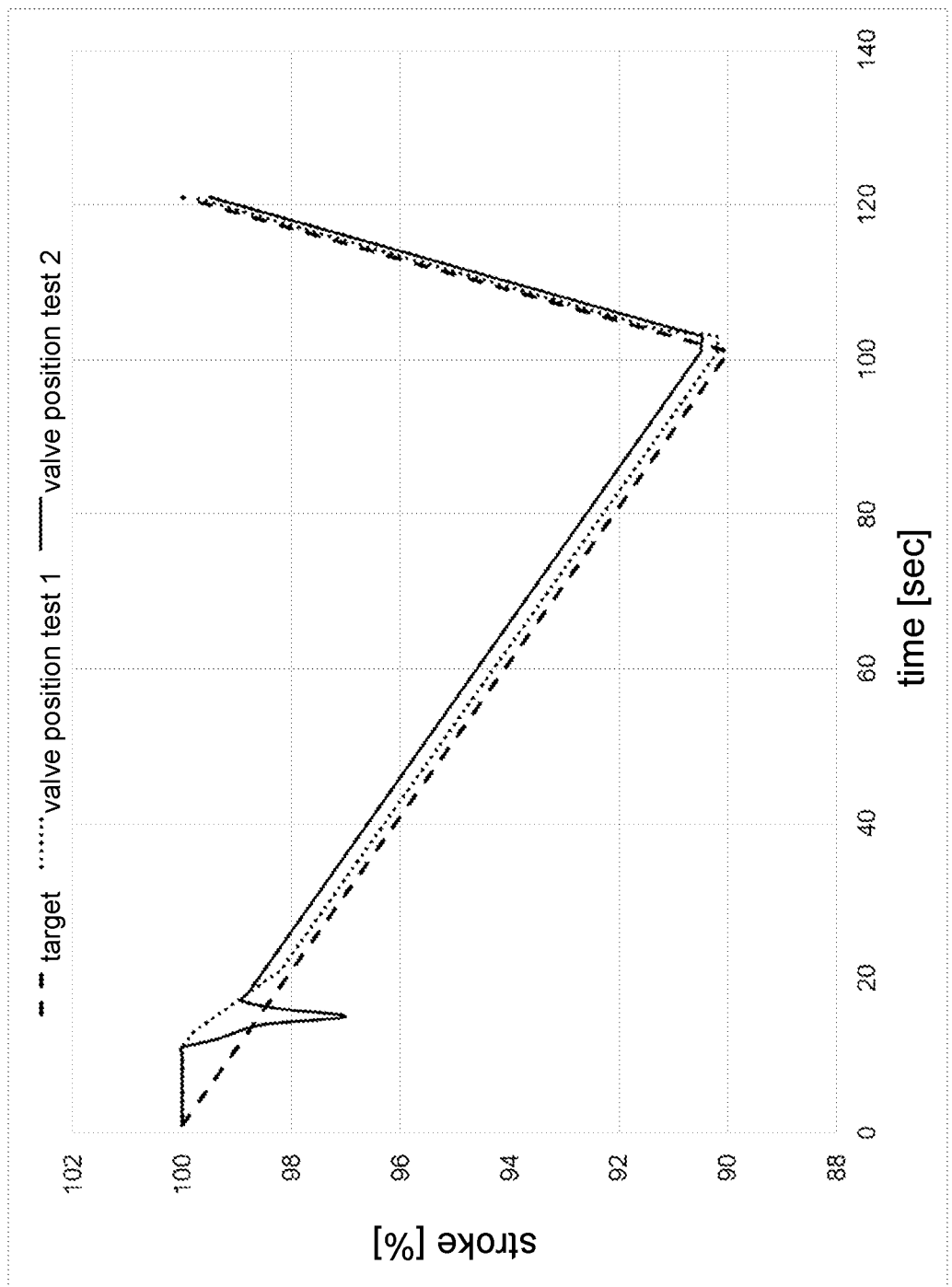
FIG. 3 shows stroke-time curves for two possible courses during a partial stroke test, including the associated setpoint curve.

FIG. 3 shows the stroke-time curves of typical partial stroke tests for control valves. The nominal curve (dashed line) slowly reduces the valve stroke from 100%, i.e. fully open, to 90%, after which the valve is fully released again. The return to the open position may be faster. Test 1 (dotted line) and test 2 (solid line) represent possible real curves for such a partial stroke test (i.e. actual curves). In the case of test 2, the breakaway torque is higher, so that the actuator has to apply a greater force, which causes the valve member to oscillate when it starts to move until the control system catches this movement again. Test 2 also shows a greater overall deviation from the target curve.

Figure 4:
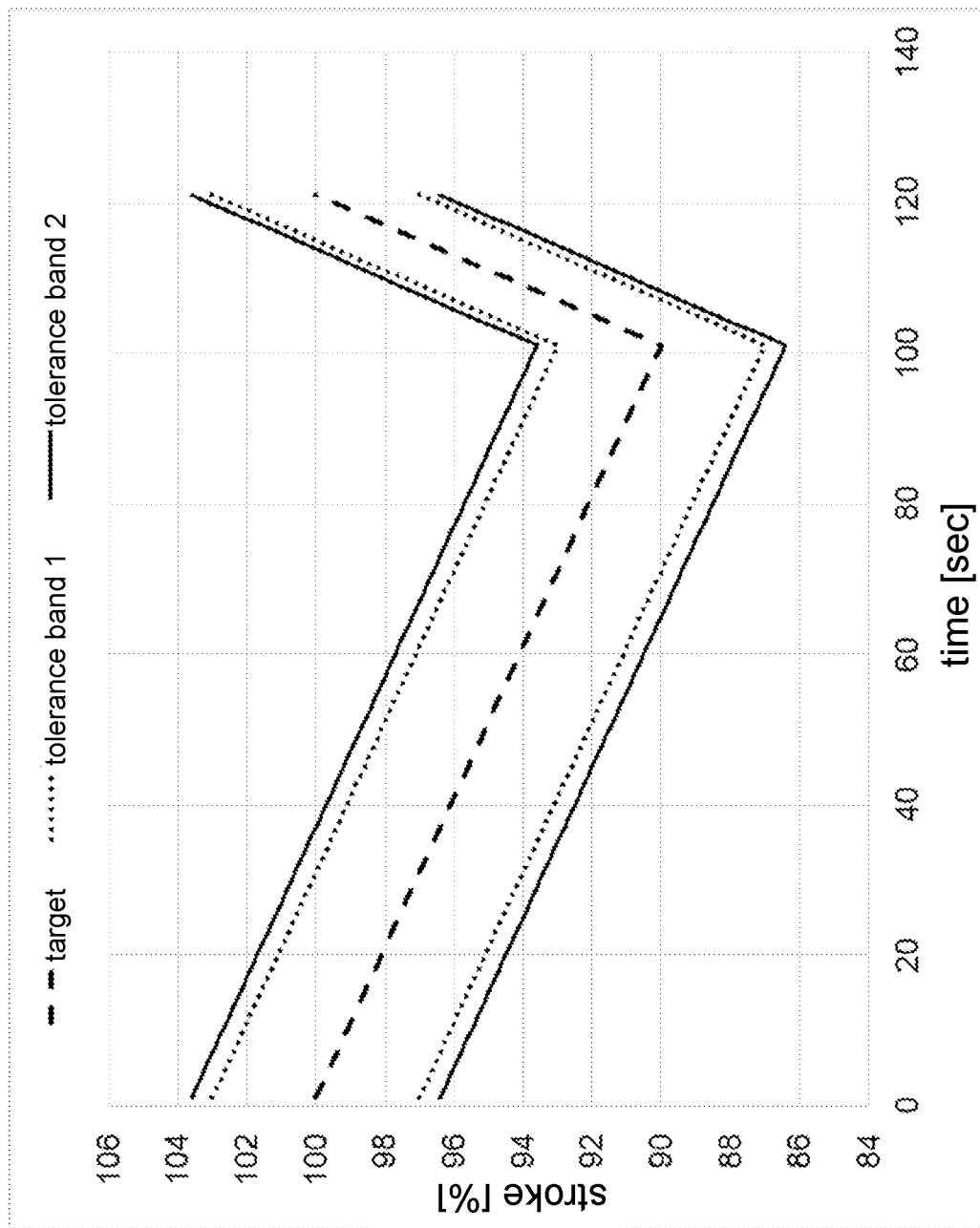
FIG. 4 shows tolerance bands for the stroke-time curves of FIG. 3.

To solve the problem underlying the disclosure, the abort criteria for a partial stroke test must be adapted so that they fit the situation of e.g. test 1 or test 2 in each case. For this purpose, a reference curve is recorded in the as-new or technically correct condition of the valve, and the abort criteria for this valve are determined on the basis of this reference curve. In the case of pure proportional control, as is generally the case with positioners for valves, for example, the control deviation (difference between the setpoint and actual position of the valve member) can be considered. A tolerance (of typically 2%) is then added to the maximum control deviation (of e.g. 1% or 4%) that occurred during the reference measurement, so that a permissible maximum control deviation (of e.g. 3% or 6%) is obtained as termination criteria. These general conditions form tolerance bands around the setpoint curve in a stroke-time diagram. Such tolerance bands are shown as an example in FIG. 4. On the basis of test 2 (as reference case), a wider tolerance band results than on the basis of test 1, since in test 2 a larger control deviation already occurs, which represents the still functioning normal case for the valve.

It is of course possible to design these criteria differently for upward and downward deviations (not shown).

The same procedure can be followed with regard to the pressure in the actuator system of the safety valve. If the pressure falls below a predefined value, a partial stroke test is aborted. For example, a minimum actuator pressure of 1900 mbar could be reached in test 1 and a minimum actuator pressure of 1500 mbar in test 2. Assuming that this corresponds to the fully functional state of the respective valve, a pressure abort limit of 1500 mbar can be defined for the valve of Test 1, for example, and a pressure abort limit of 1100 mbar can be defined for the valve of Test 2, assuming a maximum permissible pressure deviation of 400 mbar from the normal state. The pressure condition for the valve of test 1 is thus significantly stricter than for the valve of test 2.

In order to obtain better situation-related termination criteria for the partial stroke test, these criteria can also be designed to be range-dependent. In this way, statements can be made about the exact course of the test and, if necessary, about changes to the fittings, and a differentiated diagnosis can be carried out. For example, different termination criteria apply in the range of the breakaway than in the range of the uniform movement. A total of 4 or 5 ranges—breakaway torque, sliding friction, hysteresis on reversal of direction, sliding friction on return and, if necessary, stick slip effect—can be defined. This can be seen in FIG. 5. There again the nominal curve is shown dashed. For the sake of clarity, only the lower tolerance bands of the abort criteria are shown. The limits for the valve of test 1 are drawn as dotted lines (range of sliding friction, forward and backward) and as fine dashed lines (range of breakaway and hysteresis at motion reversal), the limits for the valve of test 2 are drawn as coarse dashed lines (range of sliding friction, forward and backward) and solid lines (range of breakaway and hysteresis at motion reversal).

Breakaway is the point at which the static friction is just overcome and the valve member starts to move. This is the transition to sliding friction. In a typical valve, the breakaway torque is increased over time, e.g. by deposits between the valve stem and the seal seat or by increased friction in the valve trim. This can even lead to an abort of the partial stroke test if, for example, the tolerance of the control deviation is exceeded or the minimum pressure is undershot. If the test is aborted in this range, it can therefore be concluded that the static friction has changed due to permanent changes in the mechanics of the structure (e.g. changes in packing friction or changes that only occur when the structure is moved for the first time after a long period of inactivity). This can be, for example, the resinification of oil. Appropriate maintenance measures may be provided here.

Sliding friction is the term used to describe constant friction in sliding processes that is dependent on the direction of motion. There is always a constant frictional force which counteracts the relative movement of two surfaces in contact and is independent of the speed of the relative movement. In the case of a valve, packings (e.g. made of graphite or PTFE) used to counteract penetrating dirt or an acting liquid or vapor pressure cause a relatively high sliding friction. This is due to the fact that the packings are compressed by means of screws or springs and thus have a large contact area. If the test breaks down in this range, changes in the sliding friction or changes in the spring constant of the drive springs can be inferred.

The hysteresis here refers either to the difference in the setpoint change (after a setpoint reversal) until a change in the position of the valve occurs, or to the pressure change that is required after a setpoint change until a movement of the valve occurs. The reason for this hysteresis is mainly the mechanical (static) friction in the valve (especially e.g. in case of ball valves) and/or the influence of flow forces (especially e.g. in case of butterfly valves). In the case of a test failure in the hysteresis range, it is may be concluded that there has been a permanent change in static friction due to mechanical changes in the structure (e.g. changed packing friction). If the changed friction in the range of breakaway torque and in the range of hysteresis is now considered, the torque which has occurred, for example, due to a downtime, may be determined.

Figure 5:
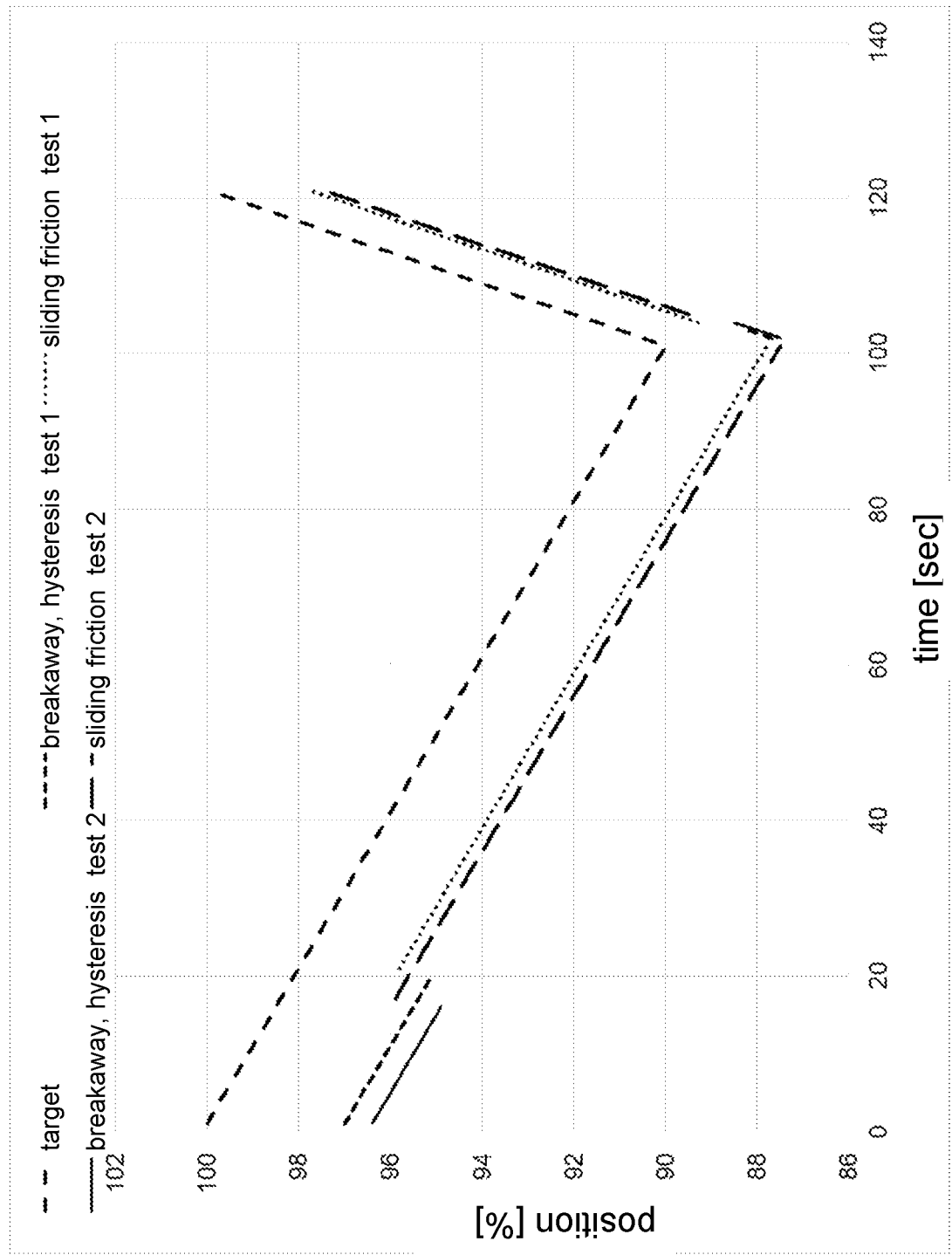
FIG. 5 shows range-dependent tolerance bands for the stroke-time curves of FIG. 3.

Sliding friction during return flow: After the hysteresis has been overcome, the valve member changes from static friction to sliding friction again. When returning to the initial position, the valve is usually moved faster in order to keep the duration of the partial stroke test as short as possible. These ranges are shown in FIG. 5, in particular also the different formation of the corresponding tolerance bands for the valves of test 1 and test 2.

If the static friction between two solid bodies is greater than the sliding friction, the stick-slip effect can occur. Due to the seals on the piston rod and piston, comparatively strong static and sliding friction occurs in pneumatic or hydraulic cylinders. As soon as the piston starts to move, the air relaxes. For this reason, the stick-slip effect is particularly pronounced in slow movements that can only be driven with the aid of small differential pressures. The stick-slip effect also occurs with dynamically loaded seals, where release from the seal seat is made more difficult as a result of high pressure loads, higher temperatures and longer downtimes. In the event of a test abort via the abort criterion control deviation of position or a pressure abort in this range, a change in the ratio of sliding to static friction can be concluded. The range for the occurrence of stick-slip effects is not shown here—typically these occur shortly after the valve member starts moving.

Figure 6:
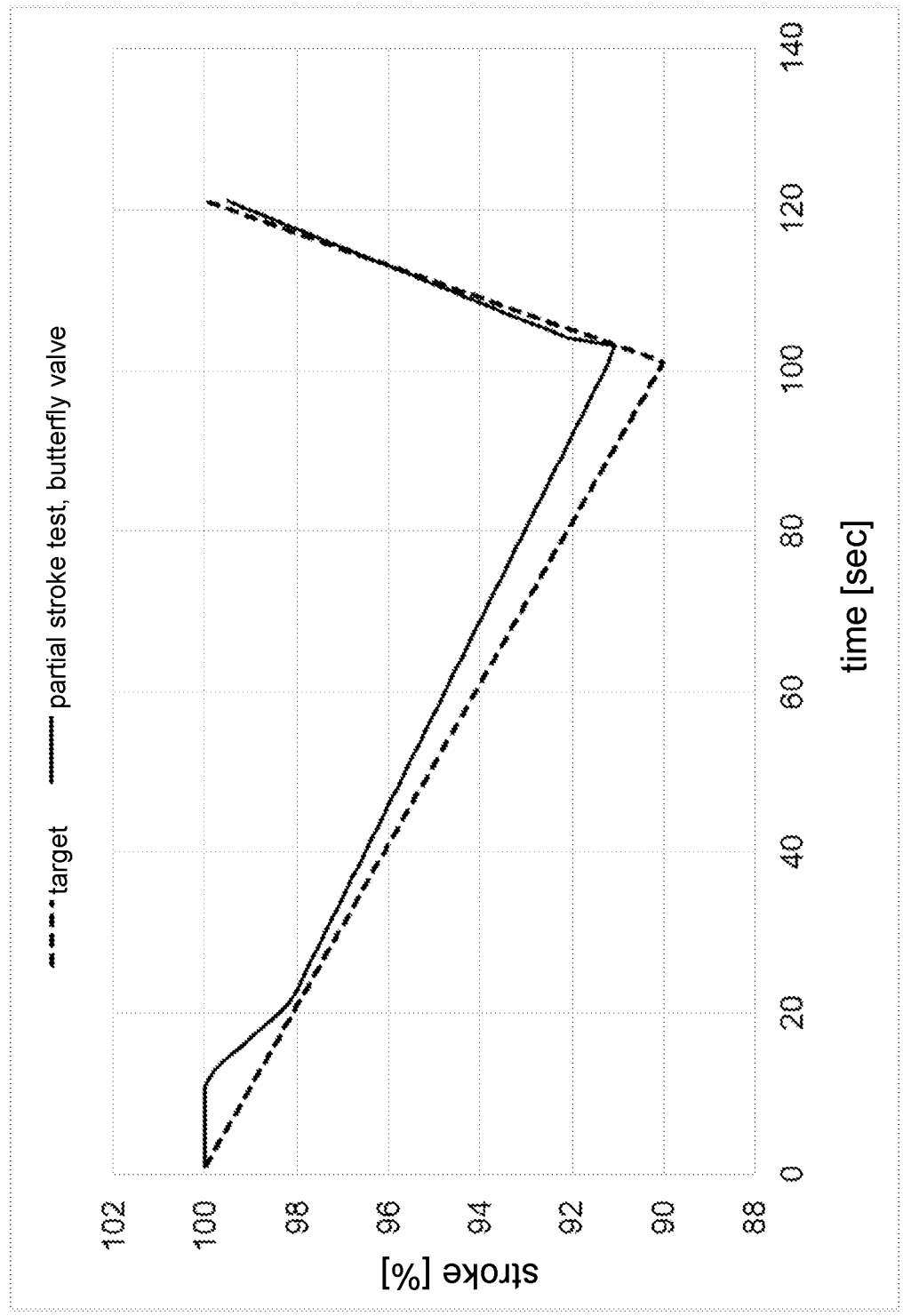
FIG. 6 shows an exemplary stroke-time curve from a partial stroke test on a butterfly valve.

FIG. 6 shows the typical course of a stroke-time curve of a partial stroke test for a safety valve of the butterfly valve type (solid line), again together with the associated setpoint curve (dashed line). It can be seen that basically the same effects occur here as with a control valve, and that the procedure according to the disclosure therefore also makes sense in this case.

It is also useful to dynamically adjust the abort criteria based on the current process conditions. For example, the current downtime, medium temperature or even the process pressure can be included in the abort criteria for a partial stroke test. For example, the criteria can be more generous in the range of breakaway after a longer downtime, while they must be stricter if the valve was only moved a short time ago, since a deviation in this case could be due to a defect in the valve, which should necessarily cause a corresponding maintenance measure.

Glossary

Fluidic Drive of a Valve

A valve is referred to as fluidically driven or actuated if the actuator stem of the valve is moved by a diaphragm which is pressurized by a fluid, typically compressed air, and is thus positioned.

Stroke-Pressure Curve

The stroke-pressure curve of a valve or a partial stroke test indicates the position of the valve member, in other words: the stroke, as a function of the pressure in the drive fluid of the fluidically driven valve.

Partial Stroke Test (PST)

To ensure the safe operation of a valve, tests are performed regularly or cyclically to determine whether the actuator really moves. For these tests, it is not desired that the valve moves completely to the safety position in order not to disturb running operations. In a partial stroke test, the actuator is moved only as far as necessary to ensure that the actuator moves part of the distance without significantly affecting the process of the plant. This also includes testing whether the actuator still disengages from its position or breaks loose. After the partial stroke test, the actuator moves back to its initial position. This test can be used to check the basic movability of the actuator.

PST: See Partial Stroke Test

Relation

A relation is a mathematical relationship which is not bijective in contrast to a function (or mapping). Here, relations which are left-total are of particular interest. This means that for a relation between the sets A and B at least one element from B exists for each element from A, but not necessarily exactly one, but also even several.

Safety Valve

Safety valves in this context are control valves with an open/close mode of operation and safety-relevant application. Control valves consist of a—typically fluidic—actuator and a movable valve member and are used to regulate a fluid flow. The type of valves can be either rotary valves or globe valves. In the field of safety-relevant valves, single-acting pneumatic actuators are generally used. The actuators, which are preloaded on one side by spring forces, move independently to a safe position when the actuator is vented, i.e. when the compressed air escapes from the chamber of the actuator. This happens, for example, when a current-pressure (I/P) transducer or solenoid valve is no longer energized.

In safety valves, the safety valve is often open during normal operation, and in the event of a fault (e.g. power failure), the safety valve closes independently. The compressed air always acts against the spring force. If the actuator is now vented, the valve begins to close as the spring forces are released. In the stroke-pressure curve, this configuration causes the valve to break free against the static friction when the pressure in the actuator is reduced.

The safe position can also be current-less open (actuator vented) and closed with nonzero current (actuator supplied with air).

Stick-Slip-Effects

The stick-slip effect, also known as (self-excited) frictional vibration, refers to the jerky sliding of solid bodies moving against each other, i.e. the periodically alternating sticking and sliding. Well-known examples are chalks on blackboards, creaking doors, squeaking brakes, rattling windshield wipers, and the wet fingertip stuttering over a latex balloon or causing the rim of a drinking glass to vibrate.

Valve Member

The valve member is the element that closes the valve when it is pressed onto the valve seat.

| Reference numerals | |
| --- | --- |
| 210 | Setpoint of stroke |
| 220 | Actual pressure |
| 230 | Actual stroke |
| 240 | Breakaway pressure |
| 250 | Breakaway pressure reserve |
| 310 | Breakaway reserve |
| 320 | Closing pressure reserve |
| 330 | Two points for determining the interpolation straight line |
| 340 | Interpolation straight line |
| 350 | Pressure value at stroke = 0 |
| 360 | 90% of stroke, end of PST |

The invention claimed is:

1. A method for establishing termination criteria for a partial stroke test of a fluidically driven safety valve having a valve member and a spring return;
  wherein the valve member is configured to be moved into a safety position by the spring return in case of a complete loss of pressure of the drive fluid;
  wherein the safety valve has means for determining the pressure of the drive fluid;
  wherein the pressure of the drive fluid acts against the spring;
  wherein the safety valve has means for determining the position of the valve member;
  wherein the method comprises the following steps:
  performing a first partial stroke test of the safety valve by variation of the pressure in the drive fluid;
  wherein the first partial stroke test is performed at a point in time at which the safety valve is operable;
  recording at least the position of the valve member during the first partial stroke test;
  deriving a first relation from the recorded data, which puts at least two of the position of the valve member, the time, the pressure of the drive fluid, and a further parameter recorded during the first partial stroke test in relation to one another;
defining and saving this relation as a reference curve for this safety valve while operable;
defining at least one second relation having a predetermined distance from the reference curve;
establishing the following as termination criterion for a repeated partial stroke test of the same valve to be performed at a later time:
if the repeated partial stroke test is performed at the same valve; and
if the same data is recorded thereby; and
if a third relation is determined from said data in the same manner as the reference curve,
then the repeated partial stroke test is considered failed if the third relation has a greater distance to the reference curve than the second relation at at least one point.

2. The method according to claim 1, wherein
the stroke of the valve member as a function of time or
the pressure in the drive of the valve as a function of time or
the stroke of the valve member as a function of pressure in the drive is used as the first relation.

3. The method according to claim 1,
wherein the valve has a position control which is used during the partial stroke test, and
wherein the position control is a proportional control with a control deviation,
wherein the sum of a target curve for the position control of the valve member and the control deviation is used as the first relation.

4. The method according to claim 1,
wherein the valve has a position control which is used during the partial stroke test, and
wherein the position control is not a purely proportional control, wherein
an output variable of the position control as a function of time is used as the first relation.

5. The method according to claim 1, wherein
the at least one second relation has a distance of 2% to the reference curve;
wherein this distance applies upwards and downwards.

6. The method according to claim 1, wherein
the at least one second relation has different distances to the reference curve for different positions of the valve member.

7. The method according to claim 6, wherein
the different distances of the at least one second relation to the reference curve respectively apply to different ranges of the movement of the valve member during a partial stroke test.

8. The method according to claim 7, wherein
the different distances and ranges are determined such that stick-slip effects are taken into account.

9. The method according to claim 1, wherein
the at least one second relation has different respective upward and downward distances to the reference curve.

10. The method according to claim 1, wherein
the distances of the second relation to the reference curve are dynamically determined depending on current conditions at one or more of the valve and the plant at the time at which the partial stroke test is performed.

11. The method according to claim 1, wherein
the partial stroke test is additionally considered failed if the pressure in the drive fluid falls below a predetermined value.

12. A method for determining the operability of a fluidically driven safety valve having a valve member and a spring return;
wherein the valve member is configured to be moved into a safety position by the spring return in case of a complete loss of pressure of the drive fluid;
wherein the safety valve has means for determining the pressure of the drive fluid;
wherein the pressure of the drive fluid acts against the spring;
wherein the safety valve has means for determining the position of the valve member;
wherein the method comprises the following steps:
performing a partial stroke test at the safety valve;
performing the method according to claim 1 on the same safety valve at a previous point in time;
based on the termination criteria defined for the safety valve by the method according to claim 1, deciding whether or not the safety valve has passed the partial stroke test and whether or not the safety valve is still to be considered operable.

13. The method according to claim 12, wherein the method steps are formulated as program code, with which the method is performable on at least one computer.

14. A non-transitory computer-readable medium having stored thereon program instructions that upon execution by a processing unit, a microcontroller, DSP, FPGA or computer or a plurality thereof in a network cause performance of a set of steps according to the method of claim 1.

15. The non-transitory computer-readable medium according to claim 14, wherein one of (i) the stroke of the valve member as a function of time, (ii) the pressure in the drive of the valve as a function of time, or (iii) the stroke of the valve member as a function of pressure in the drive is used as the first relation.

16. The non-transitory computer-readable medium according to claim 14, wherein the valve has a position control which is used during the partial stroke test, and wherein the position control is a proportional control with a control deviation, wherein the sum of a target curve for the position control of the valve member and the control deviation is used as the first relation.

17. The non-transitory computer-readable medium according to claim 14,
wherein the valve has a position control which is used during the partial stroke test, and wherein the position control is not a purely proportional control, wherein the output variable of the position control as a function of time is used as the first relation.

18. The non-transitory computer-readable medium according to claim 14,
wherein the at least one second relation has different distances to the reference curve for different positions of the valve member.

19. The non-transitory computer-readable medium according to claim 14,
wherein the different distances of the at least one second relation to the reference curve respectively apply to different ranges of the movement of the valve member during a partial stroke test.

20. The non-transitory computer-readable medium according to claim 14,
wherein the distances of the second relation to the reference curve are dynamically determined depending on current conditions at one or more of the valve and the plant at the time at which the partial stroke test is performed.

\* \* \* \* \*